United States Patent
Lovitt

(10) Patent No.: US 9,956,487 B2
(45) Date of Patent: May 1, 2018

(54) VARIABLE AUDIO PARAMETER SETTING

(71) Applicant: Microsoft Technology Licensing, LLC, Redmond, WA (US)

(72) Inventor: Andrew William Lovitt, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days. days.

(21) Appl. No.: 15/030,648

(22) PCT Filed: Oct. 27, 2014

(86) PCT No.: PCT/US2014/062315
§ 371 (c)(1),
(2) Date: Apr. 20, 2016

(87) PCT Pub. No.: WO2015/065865
PCT Pub. Date: May 7, 2015

(65) Prior Publication Data
US 2016/0243445 A1    Aug. 25, 2016

Related U.S. Application Data

(63) Continuation of application No. 14/069,093, filed on Oct. 31, 2013, now abandoned.

(51) Int. Cl.
*G06F 17/00*    (2006.01)
*A63F 13/67*    (2014.01)
(Continued)

(52) U.S. Cl.
CPC .............. *A63F 13/67* (2014.09); *A63F 13/00* (2013.01); *A63F 13/54* (2014.09); *A63F 13/69* (2014.09);
(Continued)

(58) Field of Classification Search
CPC ................ A63F 13/10; A63F 2300/305; A63F 2300/6027; A63F 2300/6081; A63F 13/00; A63F 13/54; G06F 3/04815
See application file for complete search history.

(56) References Cited

U.S. PATENT DOCUMENTS 8,231,453 B2    7/2012 Wolf et al.
2006/0009979 A1    1/2006 McHale et al.
(Continued)

FOREIGN PATENT DOCUMENTS

EP    2030660 A1    3/2009

OTHER PUBLICATIONS

Floris, Jun. 22, 2012 http://floris.wikia.com/, <http://floris.wikia.com/wiki/Increased_Difficulty?oldid=4875>.*
(Continued)

*Primary Examiner* — Justin Myhr
(74) *Attorney, Agent, or Firm* — Alleman Hall Creasman & Tuttle LLP

(57) ABSTRACT

Various embodiments relating to adjusting a variable audio parameter of a game are provided. In one embodiment, based on a user ability level, a variable audio parameter of the game is adjusted to an adjusted audio parameter that either increases the difficulty level of the game or decrease the difficulty level of the game. The adjusted audio parameter is utilized to provide audio content of the game to a user via an electronic gaming machine.

20 Claims, 8 Drawing Sheets

(51) Int. Cl.
    *A63F 13/00*     (2014.01)
    *A63F 13/69*     (2014.01)
    *G07F 17/32*     (2006.01)
    *A63F 13/54*     (2014.01)
    *A63F 13/847*     (2014.01)
    *A63F 11/00*     (2006.01)

(52) U.S. Cl.
    CPC ........ *A63F 13/847* (2014.09); *G07F 17/3272* (2013.01); *A63F 2011/0076* (2013.01)

(56) References Cited

U.S. PATENT DOCUMENTS

| | | |
|---|---|---|
| 2007/0112706 A1 | 5/2007 | Herbrich et al. |
| 2007/0265063 A1 | 11/2007 | McNally |
| 2008/0261680 A1 | 10/2008 | Buecheler et al. |
| 2008/0266250 A1 | 10/2008 | Jacob |
| 2008/0268943 A1 | 10/2008 | Jacob |
| 2009/0137314 A1* | 5/2009 | Nakayama ............ A63F 13/10 463/35 |
| 2010/0050100 A1 | 2/2010 | Dettinger et al. |
| 2010/0173712 A1 | 7/2010 | Buhr |
| 2011/0078571 A1* | 3/2011 | Asbahr ................. A63F 13/52 3/52 |
| 2013/0288777 A1* | 10/2013 | Short ....................... A61B 5/16 463/23 |

OTHER PUBLICATIONS

ISA European Patent Office, International Search Report and Written Opinion Issued in Application No. PCT/US2014/062315, Jan. 20, 2015, WIPO, 9 pages.

United States Patent and Trademark Office, Office Action Issued in Application No. 14/069,093, Jun. 9, 2015, 18 pages.

\* cited by examiner

VARIABLE AUDIO PARAMETER SETTING

CROSS REFERENCE TO RELATED APPLICATIONS

The present application is a U.S. National Phase of International Patent Application Serial No. PCT/US2014/062315, entitled "VARIABLE AUDIO PARAMETER SETTING," filed on Oct. 27, 2014, which claims priority to U.S. patent application Ser. No. 14/069,093, filed on Oct. 31, 2013, now abandoned, the entire contents of each of which are hereby incorporated by reference in their entirety for all purposes.

BACKGROUND

Computer games may offer players of varying skill levels multiple levels of difficulty that provide different challenges. Such multiple levels of difficulty are typically implemented via one or more modifications of the visual gameplay experience of the player. For example, such multiple levels of difficulty may be implemented by providing multiple courses or maps having a range of difficulties, restricting access to certain weapons or tools having increased capabilities, enabling in-game adversaries having varying capabilities, enhancing or restricting the capabilities of user on-screen avatars, controlling environmental conditions of a game such as fog effects, lighting effects, etc.

In multi-player games, issues may arise when multi-player scenarios include players of different skill levels. For example, when a novice player competes against a highly skilled player, a gaming experience at a given difficulty level can be frustrating and less than satisfactory for one or both players. Additionally, providing different difficulty levels for the novice and highly skilled player via visual gameplay modifications in a gaming session can prove challenging.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Various embodiments relating to adjusting one or more variable audio parameter of a game are provided. In one embodiment on an electronic gaming machine, a variable audio parameter of a game may be adjusted to an adjusted audio parameter based on a user ability level. The adjusted audio parameter may either increase a difficulty level of the game or decrease a difficulty level of the game. The adjusted audio parameter may then be utilized to provide audio content of the game to a user via the electronic gaming machine.

DETAILED DESCRIPTION

Figure 1:
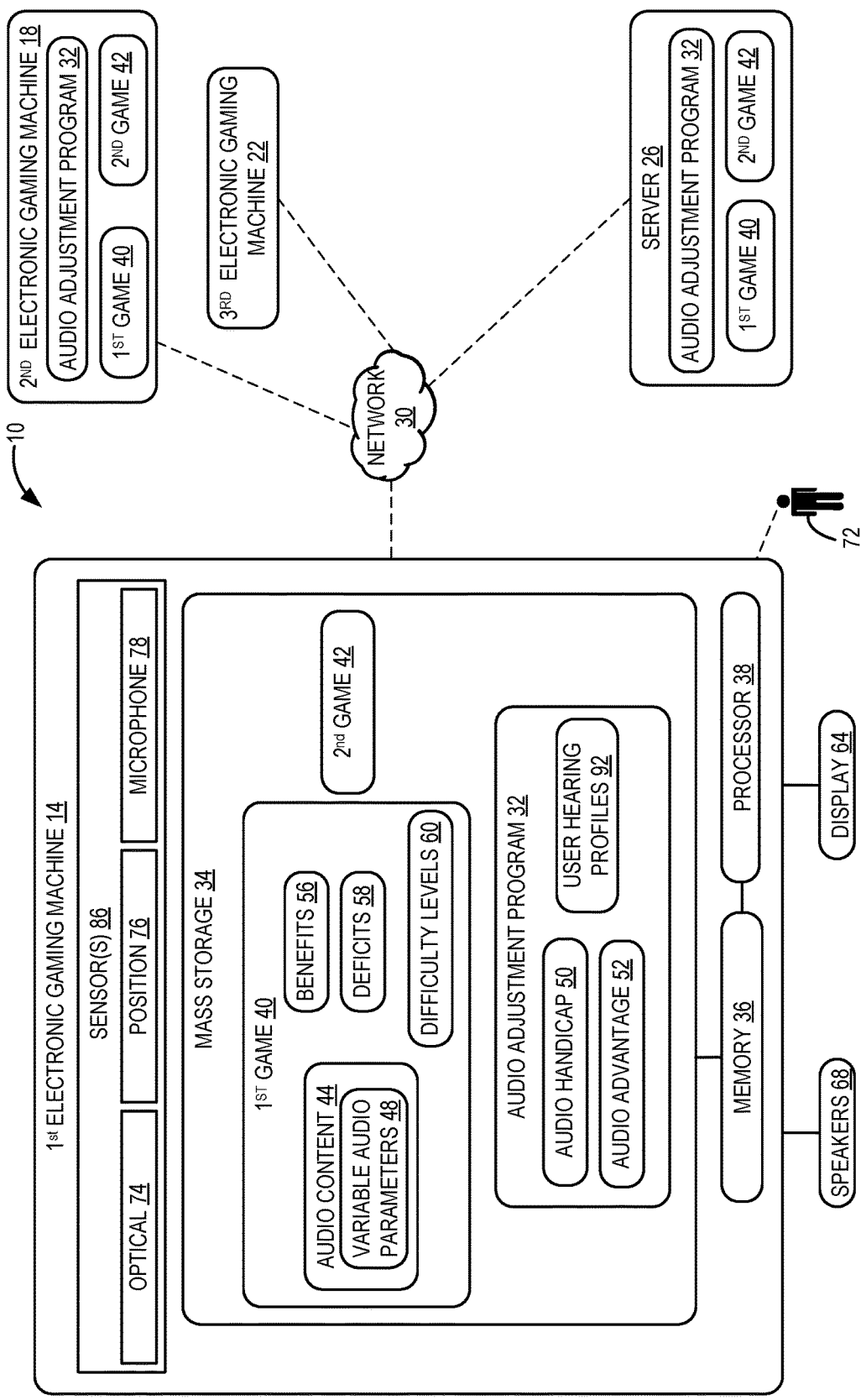
FIG. 1 shows a computing system according to an embodiment of the present disclosure.

This description relates to adjusting one or more variable audio parameters of a game. More particularly, this description relates to an audio parameter adjustment approach that utilizes a user ability level and/or a user hearing ability (referred to herein as a "hearing profile") to generate an adjusted audio parameter. As described in more detail below, a variety of different variable audio parameters may be adjusted to increase or decrease the difficulty level of a game. Audio content of the game may then be provided to a game player using one or more of the variable audio parameters.

It will be appreciated that many computer games utilize sound in conjunction with visual imagery presented via a display device to create a gaming experience. Humans can discern different intensities or volumes of sounds, different frequencies of sounds, and different types of sounds as corresponding to particular events or phenomena. Humans also have the ability to recognize the source and/or location of a sound (sometimes referred to as "sound localization"), even absent additional (e.g., visual) cues, by comparing aural cues received at both ears. Sound localization may rely on the differences (e.g., time and/or intensity) between the sounds received at both ears, similar to a person's ability to determine visual depth based on the difference(s) in visual information received at each eye.

It may be desirable in some instances (such as during video game play, for example) to enable a listener of a sound system to perceive that sounds produced by one or more speakers appear to originate at a particular location in three-dimensional acoustic space. In some embodiments, headphones may be utilized to enable the listener to perceive that sounds produced by the headphones originate at a particular location in three-dimensional acoustic space. Typical headphones may comprise, for each ear, one or more acoustic transducers configured to provide audio signals to the ear. Such "three-dimensional audio output" comprises audio output that provides the illusion that sound is coming from a location in three-dimensional acoustic space that may or may not correspond to the location of the speaker(s) producing the sound.

Other three-dimensional audio systems may utilize a plurality of speakers in order to provide three-dimensional audio effect(s). Such systems may utilize a plurality of speakers positioned near pre-defined locations relative to a user (e.g., front speakers oriented at 30 degrees to the user) and/or rely on the user being located in a particular location in order to provide the desired effect. In other examples, an audio system may utilize audio received at one or more microphones to determine the location of the speakers.

In contrast to headphones-based systems, loudspeaker-based systems are configured such that audio output from the loudspeakers is detectable by both ears of a human subject. Therefore, additional processing may be utilized to control the audio perceived by each ear, and thus to control the three-dimensional audio effect. For example, systems may utilize one or more "crosstalk cancellation" mechanisms configured such that a first audio signal (e.g., left channel) is delivered to a first ear (e.g., left ear) and a second audio signal (e.g., right channel) is delivered to a second ear (e.g., right ear) while substantially attenuating the delivery of the first audio signal to the second ear and delivery of the second audio signal to the first ear.

Regardless of the audio output mechanisms, the provision of three-dimensional audio may be based on a head-related transfer function "HRTF" and/or head-related impulse response "HRIR" to create the illusion that sound is originating from a particular location in 3D acoustic space. The HRTF describes how a given sound wave input is filtered by the diffraction and reflection properties of the head and pinna before the sound reaches the eardrum and inner ear. In other words, an HRTF may be defined based on the difference between a sound in free air and the sound as it arrives at the eardrum.

FIG. 1 shows a schematic view of a computing system 10 in accordance with an embodiment of the present disclosure. The computing system 10 includes a plurality of electronic gaming machines represented by first electronic gaming machine 14, second electronic gaming machine 18 and third electronic gaming machine 22. The plurality of electronic gaming machines may be in communication with a server computing machine 26 via a network 30, such as the Internet. In some embodiments, two or more of the electronic gaming machines may execute a multi-player game that enables the users of the gaming machines to participate in the game via the network 30.

It will be appreciated that virtually any number of different electronic gaming machines may be in communication via the network 30 without departing from the scope of this disclosure. As described in more detail below, one or more of the electronic gaming machines and server 26 may utilize an audio adjustment program 32 in accordance with the present disclosure. In other embodiments, a single electronic gaming machine may execute a game and utilize the audio adjustment program 32 in accordance with the present disclosure.

With continued reference to FIG. 1, the first electronic gaming machine 14 may include the audio adjustment program 32 stored in mass storage 34. In other examples, the audio adjustment program 32 may be streamed to the first electronic gaming machine 14 from server 26 via network 30. The audio adjustment program 32 may be loaded into memory 36 and executed by a processor 38 of the first electronic gaming machine 14 to perform one or more of the methods and processes described in more detail below. The first electronic gaming machine 14 may further include one or more electronic games, such as first game 40 and second game 42, that are stored in mass storage 34. The one or more games may be loaded into memory 36 and executed by the processor 38 to create single-player or multi-player game-play experiences.

First game 40 may utilize audio content 44 that includes one or more variable audio parameters 48. Examples of such variable audio parameters 48 are discussed in more detail below with respect to FIG. 3 and corresponding example use cases. As described in more detail below, the audio adjustment program 32 may adjust a variable audio parameter 48 to provide an audio handicap 50 or an audio advantage 52 in the context of a game. Also as described below, in some embodiments such audio handicaps 50 and audio advantages 52 may correspond to one or more benefits 56 or one or more deficits 58 that may be afforded to a player in the first game 40.

First game 40 may include or embody multiple difficulty levels 60 that provide varying challenges for players having varying user ability levels. As described in more detail below, by adjusting a variable audio parameter 48, the audio adjustment program 32 may increase or decrease a difficulty level 60 of the first game 40. In some embodiments one or more difficulty levels 60 may be characterized by discrete levels that may be quantified or otherwise described according to their varying difficulty (e.g., Audio Level 1, Audio Level 2, etc.). In other embodiments one or more difficulty levels 60 may not correspond to a discrete characterization, but rather may correspond to a general increase or decrease of game difficulty that is engaged via adjusting a variable audio parameter 48.

It will also be appreciated that the second game 42 may also include audio content, variable audio parameters, benefits, deficits, and/or difficulty levels as described above.

In some embodiments one or more of the audio adjustment program 32, first game 40, and second game 42 may be located on server 26. In these embodiments, one or more of the first electronic gaming machine 14, second electronic gaming machine 18, and third electronic gaming machine 22 may not include one or more of the audio adjustment program 32, first game 40, and second game 42, and instead may be communicatively coupled to the server 26 to receive data and/or functionality from one or more of these programs. Alternatively expressed, server 26 may provide a cloud-based service that enables remote computing machines to access one or more of the audio adjustment program 32, first game 40, and second game 42.

A display device 64 may be operatively connected to the first electronic gaming machine 14. In some embodiments, the display device may comprise a separate display, such as a standalone monitor or wall-mounted display, that is operatively connected to the first electronic gaming machine 14 via a wired or wireless connection. In other embodiments, first electronic gaming machine 14 may be integrated into the display 64 to form a single device. Such devices may include, for example, desktop computing devices, mobile computing devices such as hand-held smart phones, e-readers, laptops, notebooks and tablet computers, interactive televisions, gaming systems, wearable computing devices such as head-mounted display (HMD) devices, watches, jewelry, computing-capable clothing, or other suitable type of computing device.

Figure 2:
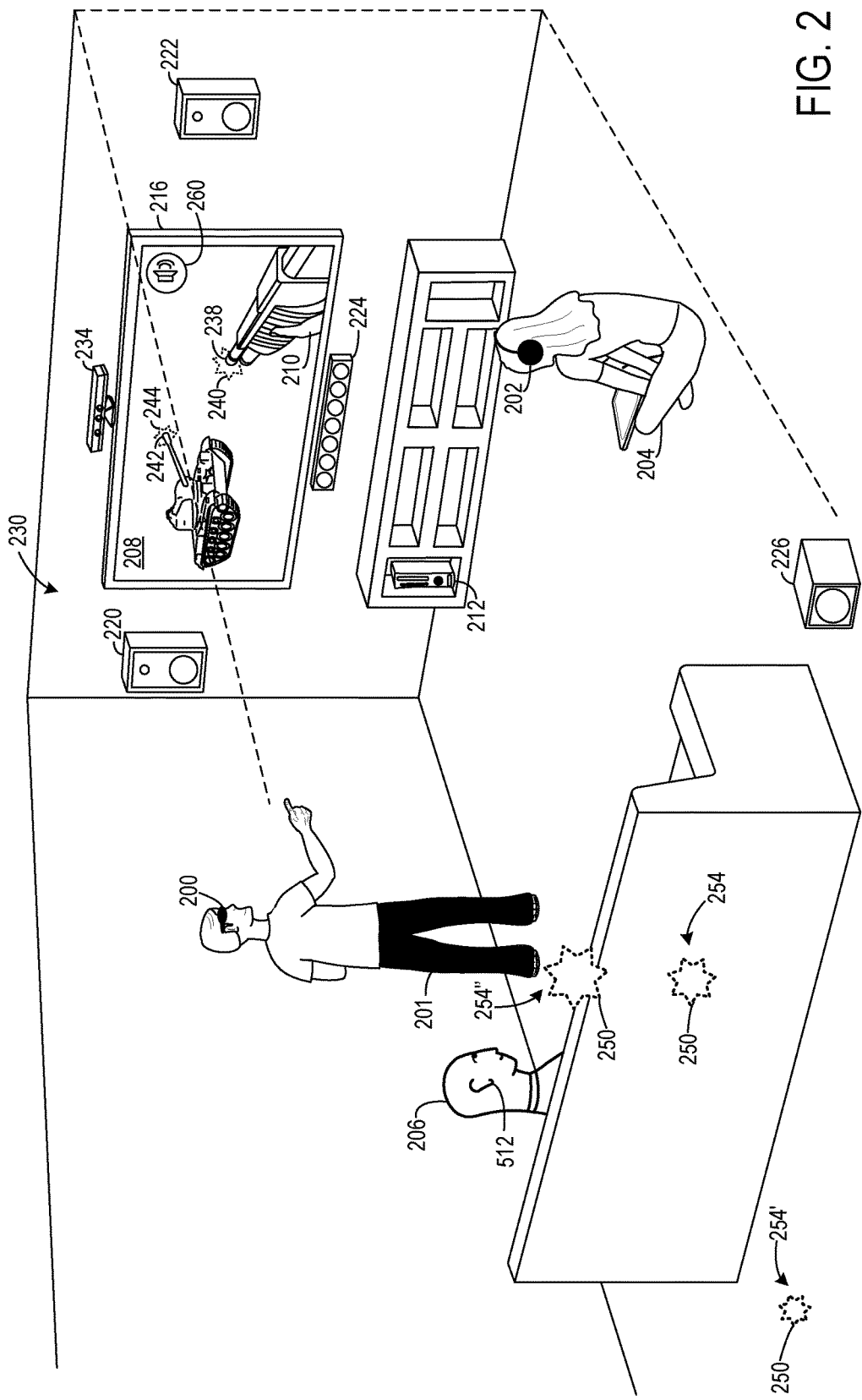
FIG. 2 shows a schematic perspective view of a room including users playing a game via electronic gaming machines according to an embodiment of the present disclosure.

In some embodiments, the display device 64 may take the form of a virtual or mixed-reality capable device, such as an HMD device, that may create a mixed reality environment. The mixed reality environment may include one or more visual elements in the form of virtual images, such as three-dimensional (3D) holographic objects and two-dimensional (2D) virtual images, that are generated and displayed via the HMD device. With reference to FIG. 2, an example HMD device 200 is shown being worn by a user 201.

The first electronic gaming machine 14 and/or the display device 64 may also include or be communicatively coupled, via wired or wireless connections, to one or more speakers 68. The one or more speakers 68 may broadcast audio content 44 of the first game 40 and/or other audio content to a user 72 of the first electronic gaming machine 14. In some embodiments the one or more speakers may be integrated into the first electronic gaming machine 14 or the display 64. In other embodiments the one or more speakers 68 may be freestanding components that are located or mounted in a physical environment, such as a room. With reference also to FIG. 2, in some embodiments the speakers 68 may comprise headphones 202 that may be worn by a user 204.

The first electronic gaming machine 14 and/or the display device 64 may also include various sensors 86 and related systems. For example, the electronic gaming machine 14 may include an optical sensor system 74 that utilizes at least one outward facing sensor, such as an optical sensor. The outward facing sensor(s) may detect movements within its field of view, such as gesture-based inputs or other movements performed by a user 72 or by a person or physical object within the sensors' field of view. The outward facing sensor(s) may also capture two-dimensional image information and depth information from a physical environment and physical objects within the environment. For example, the outward facing sensor(s) may include a depth camera, a visible light camera, an infrared light camera, and/or a position tracking camera.

The first electronic gaming machine 14 and/or the display device 64 may include depth sensing via one or more depth cameras. In one example, each depth camera may include left and right cameras of a stereoscopic vision system. Time-resolved images from one or more of these depth cameras may be registered to each other and/or to images from another optical sensor such as a visible spectrum camera, and may be combined to yield depth-resolved video.

In other embodiments a structured light depth camera may be configured to project a structured infrared illumination, and to image the illumination reflected from a scene onto which the illumination is projected. A depth map of the scene may be constructed based on spacings between adjacent features in the various regions of an imaged scene. In still other embodiments, a depth camera may take the form of a time-of-flight depth camera configured to project a pulsed infrared illumination onto a scene and detect the illumination reflected from the scene. It will be appreciated that any other suitable depth camera may be used within the scope of the present disclosure.

The first electronic gaming machine 14 and/or the display device 64 may also include a position sensor system 76 that utilizes one or more motion sensors to enable position tracking and/or orientation sensing. For example, the position sensor system 76 may be utilized to determine a head pose orientation of a user's head. In one example, position sensor system 76 may comprise an inertial measurement unit configured as a six-axis or six-degree of freedom position sensor system. This example position sensor system may, for example, include three accelerometers and three gyroscopes to indicate or measure a change in location of the corresponding first electronic gaming machine 14 and/or the display device 64 within three-dimensional space along three orthogonal axes (e.g., x, y, z), and a change in an orientation of the gaming machine and/or display device about the three orthogonal axes (e.g., roll, pitch, yaw).

Position sensor system 76 may also support other suitable positioning techniques, such as GPS or other global navigation systems. Further, while specific examples of position sensor systems have been described, it will be appreciated that other suitable position sensor systems may be used. It will also be appreciated that user consent may be obtained prior to accessing or utilizing positioning or other personal information related to a user.

The first electronic gaming machine 14 and/or the display device 64 may also include a microphone system 78 that includes one or more microphones. In this manner, the first electronic gaming machine 14 and/or the display device 64 may receive audio input from a user 72 and/or other sources. In some embodiments, the first electronic gaming machine 14 may use such audio input to infer speaker locations in a physical environment and/or determine a shape, configuration, object location, etc. of a room.

It will be appreciated that many other types and configurations of sensors and display devices having various form factors, whether separate from or integrated with first electronic gaming machine 14, may also be used and are within the scope of the present disclosure. Further, additional details regarding the components and computing aspects of the first electronic gaming machine 14, second electronic gaming machine 18, third electronic gaming machine 22 and server 26 are described in more detail below with reference to FIG. 7.

Figure 3:
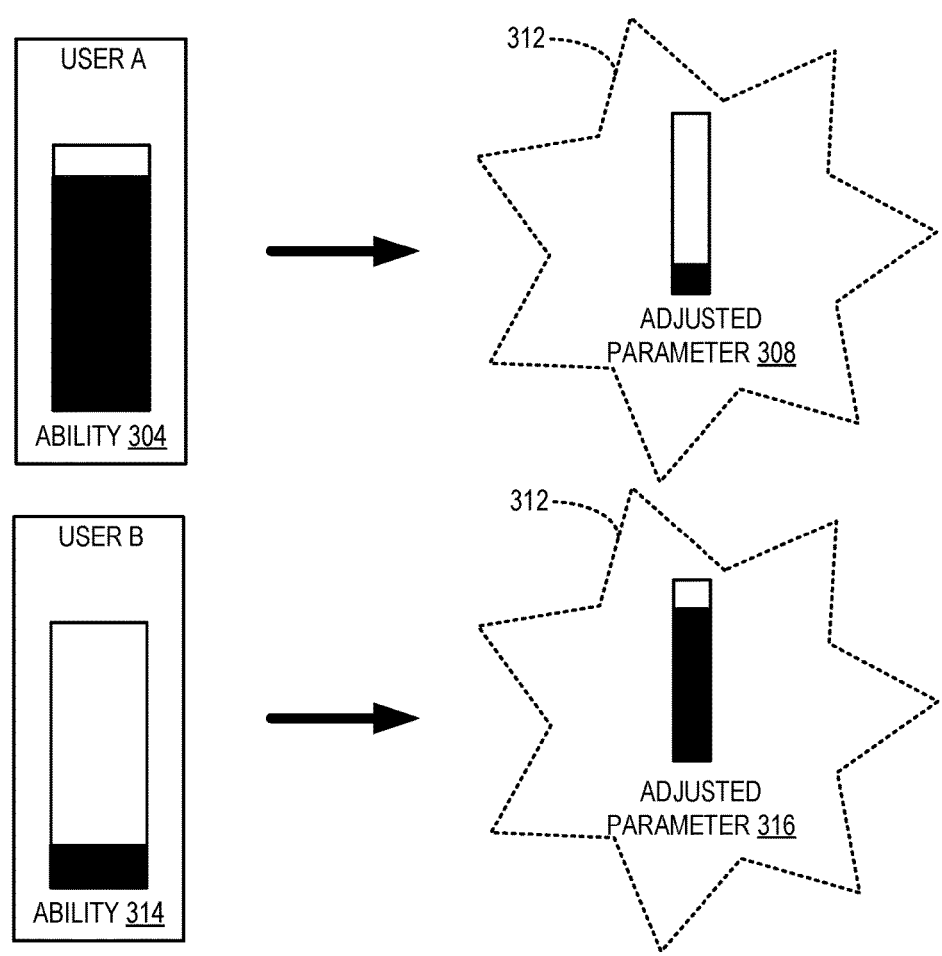
FIG. 3 shows a schematic view of different user ability levels of two users and corresponding adjusted audio parameters according to an embodiment of the present disclosure.

With reference now to FIGS. 2 and 3, descriptions of example use cases and embodiments of the present disclosure will now be provided. Turning to FIG. 2 and as described in more detail below, a first user 206 may be playing a first-person shooter game 208 that comprises an interactive digital environment including a user-controlled element 210 (e.g., first-person humanoid character). The game may be executed by a gaming console 212 with images displayed on a wall-mounted display 216 and audio content 44 of the game broadcast via speakers 220, 222, 224 and 226 in a living room 230.

User-controlled element 210 may be controlled, for example, via a hand-held game controller (not shown) operated by the first user 206. It will also be appreciated that in other embodiments the user-controlled element 210 may be controlled based on the movement(s) of a human subject imaged by a tracking system 234 that includes an optical sensor system as described above with reference to FIG. 1. In other embodiments, user-controlled element 210 may be controlled via the HMD device 200, or via additional and/or different input devices including, but not limited to, keyboards, mice, microphones for voice recognition, and the like.

While user-controlled element 210 is illustrated as being human-like, it will be appreciated that the term "user-controlled element" refers to any user-controlled element (e.g., vehicle, fantasy character, game perspective, etc.) provided by gaming console 212. Furthermore, although the user-controlled element 210 is illustrated as being presented via display device 216 in a "first-person" view, it will be appreciated that the user-controlled element may comprise any suitable visual representation without departing from the scope of the present disclosure.

In the illustrated example of FIG. 2, the interactive digital environment of game 208 includes virtual space sound source 238 (e.g., weapon muzzle brake of a user-controlled weapon) and virtual space sound source 242 (e.g., tank muzzle brake). As used herein, the term "virtual space sound source" refers to any element (e.g., scenery, user-controlled characters, non-user-controlled characters, etc.) generated by gaming console 212 with which sound is programmatically associated (e.g., "originates" from). In other words, each virtual space sound source includes one or more associated sounds such that, during interaction with the virtual environment, one or more of the associated sounds are programmed to be "output" from a particular virtual space sound source.

In the example of FIG. 2, virtual space sound sources 238 and 242 are illustrated as each comprising respective visual representations 240 and 244 (e.g., muzzle flashes) presented via display 216. It will also be appreciated that in some embodiments virtual space sound sources may provide sound even when a corresponding visual is not presented via display device 216. Examples of such "off-screen" sounds include, but are not limited to, ambient sounds, sounds originating from off-screen characters, actions, game elements, etc.

The game 208 may provide an immersive experience that includes providing audio output via speakers 220, 222, 224 and/or 226 such that sounds associated with virtual space sound sources may appear to originate from world space sound source positions in a variety of locations within the room 230. As used herein, the term "world space sound source position" refers to a position in world space from which one or more sounds of a given virtual space sound source are perceived by a user to originate. In some embodiments and as described in more detail below, one or more virtual space sound sources may correspond to a world space sound source position that is not within the field of view of a user.

In one example, first user 206 may have extensive experience and skill playing the first-person shooter game 208. Accordingly and as schematically illustrated in FIG. 3, a first user ability level 304 (in this example, a gaming ability) of the first user 206 (represented here as "User A") with respect to the game 208 may be correspondingly high. To provide a more challenging gaming experience to first user 206, the audio adjustment program 32 may adjust a variable audio parameter of the game 208 to increase the difficulty level 60 of the game. Alternatively expressed, the audio adjustment program 32 may create an audio handicap that increases the game difficulty level.

For example, within the game 208 another player's on-screen avatar may be approaching the user's on-screen avatar (not shown) associated with the user-controlled element 210 from behind the user's avatar, such that the other player's avatar is not displayed on the display 216. To indicate the approaching on-screen avatar to the first user 206, the gaming console 212 may generate a default sound 250 that is located at a default world space sound source position 254 corresponding to the location of the approaching avatar. In this example, the default world space sound source position 254 is approximately 3 feet to the right, below and slightly behind the head of the first user 206.

In this embodiment, the variable audio parameter may comprise the default world space sound source position 254, or location, of the default sound 250. Accordingly, to provide a more challenging experience, the audio adjustment program 32 may move the location of the default sound 250 to an adjusted world space sound source position 254'. As the adjusted world space sound source position 254' is further away from and more directly behind and below the first user 206 as compared to the default world space sound source position 254, this adjusted location would take more movement of the user's on-screen avatar to see and/or engage with the approaching avatar, thus making it more difficult for the first user 206 to respond to the approaching threat. With reference again to FIG. 3, such an adjusted audio parameter 308 that corresponds to an increased difficulty level is schematically represented within the sound 312.

In another example, first user 206 may have limited experience and skill playing the first-person shooter game 208. Accordingly and as schematically illustrated in FIG. 3, a second user ability level 314 of the first user 206 (represented here as "User B") with respect to the game 208 may be correspondingly low. To assist the inexperienced first user 206, the audio adjustment program 32 may adjust a variable audio parameter of the game 208 to decrease the difficulty level 60 of the game. Alternatively expressed, the audio adjustment program 32 may create an audio advantage that decreases the game difficulty level.

With respect to the example above, the audio adjustment program 32 may move the location of the default sound 250 to an adjusted world space sound source position 254". As the adjusted world space sound source position 254" is closer to the field of view of the first user 206 as compared to the default world space sound source position 254, this adjusted position would take less movement of the user's on-screen avatar to see and/or engage with the approaching avatar, thus making it easier for the first user to respond to the approaching threat. With reference again to FIG. 3, such an adjusted audio parameter 316 is schematically represented within the sound 312. Alternatively expressed, the audio adjustment program 32 may actively change the fidelity of the spatial and auditory cues that the first user 206 uses to navigate while playing the game 208.

In other embodiments, a variable audio parameter 48 may comprise a volume of the default sound 250. Accordingly, to provide a more challenging experience for a player, the audio adjustment program 32 may decrease the volume of the default sound 250 to a decreased volume. In FIG. 2 such a decreased volume is schematically indicated by the smaller size indicator of default sound 250 at adjusted world space sound source position 254' as compared to the default size indicator of default sound 250 at world space sound source position 254. With reference to FIG. 3, such an adjusted audio parameter 308 is also schematically represented within the sound 312. It will also be appreciated that in some embodiments, the default sound 250 may be muted to provide a more challenging experience for a player. It will also be appreciated that in some examples the audio adjustment program 32 may utilize a decreased volume default sound 250 to provide a benefit to a less experienced user. For example, where the default sound 250 comprises background battlefield sounds, decreasing such sounds may allow the player to hear another game sound, such as footsteps, further away as compared to a more experienced user who is presented with louder background battlefield sounds.

Conversely, to decrease the difficulty level 60 of the game and provide a less challenging experience, the audio adjustment program 32 may create an audio advantage by increasing the volume of the default sound 250. In FIG. 2 such an increased volume is indicated by the larger size indicator of default sound 250 at adjusted world space sound source position 254" as compared to the default size indicator of default sound 250 at world space sound source position 254. With reference to FIG. 3, such an adjusted audio parameter 316 is also schematically represented within the sound 312.

In other embodiments, a variable audio parameter 48 may comprise a temporality of the default sound 250. As used herein, "temporality" refers to a timing, sequence, or other temporal aspect of a sound. In one example and to provide a more challenging experience for a player, the audio adjustment program 32 may delay the broadcast of the default sound 250 to provide less reaction time for the player. For example, where a default timing for the default sound 250 is 3 seconds before the other player's avatar shoots at the avatar of the first user 206, the audio adjustment program may delay the broadcast of the default sound to 1 second before the other player's avatar shoots.

Conversely, to decrease the difficulty level 60 of the game and provide a less challenging experience, the audio adjustment program 32 may create an audio advantage by advancing the broadcast of the default sound 250 to provide more reaction time for the player. For example, where the default timing for the default sound 250 is 3 seconds before the other player's avatar shoots at the avatar of the first user 206, the audio adjustment program may advance the broadcast of the default sound to 5 seconds before the other player's avatar shoots.

In other embodiments, a variable audio parameter 48 may comprise a frequency of the default sound 250. For example, the first user 206 may have a hearing impairment that limits the user's ability to hear sounds above 4 Kilohertz (kHz). To provide a more challenging experience for the first user 206, the audio adjustment program 32 may adjust the default sound 250 such that a greater portion of the sound is above 4 kHz, and less is below 4 kHz, as compared to the unadjusted default sound. In this manner the first user 206 will hear less of the default sound 250, thereby increasing the chance that the first user may not react appropriately.

Conversely, to decrease the difficulty level 60 of the game and provide a less challenging experience, the audio adjustment program 32 may create an audio advantage by adjusting the default sound 250 such that a greater portion of the sound is below 4 kHz as compared to the unadjusted default sound. In this manner the first user 206 will hear more of the default sound 250, thereby increasing the chance that the first user will react appropriately.

In other embodiments, a variable audio parameter 48 may comprise a type of the default sound 250. As used herein, "type" refers to an action, occurrence, or event to which a sound corresponds. In one example, the default sound 250 may be a twig snapping that indicates the location of the other players' avatar while sneaking up behind the avatar of the first user 206. To provide a more challenging experience for the first user 206, the audio adjustment program 32 may adjust the type of the default sound 250 from a twig snapping to tall grass being brushed, which is a more subtle sound that is more difficult to discern and less likely to trigger alarm. Conversely, to decrease the difficulty level 60 of the game and provide a less challenging experience, the audio adjustment program 32 may create an audio advantage by adjusting the type of the default sound 250 from a twig snapping to a flock of quail being flushed and flying away, which sound comprises a cacophony of quails calling with wings flapping against the wind. Such a sound of quail being flushed is a more distinct and jarring sound that is easier to discern and more likely to trigger alarm.

In the above embodiments, the user ability level relates to the user's level of skill with respect to a game ("gaming ability"). In other embodiments, the user ability level may relate to a hearing ability of a user. For example, a user may have a hearing impairment as compared to an average human hearing ability. In this example, the audio adjustment program 32 may adjust a variable audio parameter 48, including but not limited to one or more of the example variable audio parameters discussed above, based on the user's hearing impairment to either increase or decrease the difficulty level 60 of the game. In another example, a user may have an above-average hearing ability as compared to an average human hearing ability. In this example, the audio adjustment program 32 may adjust a variable audio parameter 48 based on the user's above-average hearing to either increase or decrease the difficulty level of the game.

With reference again to FIG. 1, in some embodiments one or more user hearing profiles 92 may be stored in audio adjustment program 32 (or in other portions of mass storage of an electronic gaming machine, or on server 26). A user hearing profile 92 may include data related to a user's hearing ability. Accordingly, in these embodiments the audio adjustment program 32 may utilize data from a user hearing profile 92 to adjust one or more variable audio parameters 48 of a game to one or more adjusted parameters that increase or decrease the difficulty level of the game.

In one example, the first electronic gaming machine 14 may generate a user hearing profile 92 via input from a user 72. As described in more detail below, the input may comprise data of the user's performance related to one or more games and/or user ability tests administered by the gaming machine. The input may also comprise user ability information received from the user, such as a self-reported hearing ability. For example, a user may provide voice input to the first electronic gaming machine 14 in which the user states, "I have a hearing deficit in my left ear; please modify the sound in this game to compensate for this deficit."

In some embodiments, the server 26 may receive one or more hearing profiles 92 from one or more electronic gaming machines or other sources. The server 26 may then provide a hearing profile 92 to one or more other electronic gaming machines to enable the machines to adjust a variable audio parameter of a game to an adjusted audio parameter. In one example, the server 26 may provide a hearing profile 92 associated with a user 72 to the first electronic gaming machine 14 when the user logs into the user's account stored on server 26 via the first machine. The first electronic gaming machine 14 may utilize the hearing profile 92 to adjust a variable audio parameter of the first game 40 or the second game 42 to an adjusted audio parameter when the user 72 initiates a session of either game.

Subsequently, the user 72 may log into the user's account stored on server 26 via the second electronic gaming machine 18. The server 26 may then provide the hearing profile 92 associated with user 72 to the second electronic gaming machine 18. In this manner, the second electronic gaming machine 18 may utilize the hearing profile 92 to adjust a variable audio parameter of the first game 40 or the second game 42 to an adjusted audio parameter when the user 72 initiates a session of either game on the second machine.

In some embodiments, the first electronic gaming machine 14 may operate on a first platform such as, for example, a first operating system, a first gaming system platform, etc., while the second electronic gaming machine 18 operates on a second platform that is different from the first platform. Advantageously, in this manner the server 26 may facilitate the adjustment of a variable audio parameter 48 across multiple electronic gaming machines operating on different platforms by distributing the hearing profile 92 of a user to each electronic gaming machine used by the user. In other embodiments, the server 26 may facilitate the adjustment of a variable audio parameter 48 across multiple electronic gaming machines operating on different platforms by providing an adjusted audio parameter utilized on the first electronic gaming machine 14 by the user 72 to each other electronic gaming machine used by the user.

In other embodiments, the user ability level may relate to a user's reaction time to visual and/or aural stimuli. For example, a user may have slower reaction times as compared to an average human's reaction times. In this example, the audio adjustment program 32 may adjust a variable audio parameter 48 to decrease the difficulty level 60 of the game. In another example, a user may have faster reaction times as compared to an average human's reaction times. In this example, the audio adjustment program 32 may adjust a variable audio parameter 48 to increase the difficulty level 60 of the game.

In some embodiments, data of a user's performance related to the first game 40 and/or second game 42 may be gathered to determine a user ability level of the user. For example, the audio adjustment program 32 may gather data related to a user's levels of achievement playing the first game 40, and may utilize such data to determine and/or adjust the user ability level of the user. In some embodiments, sensor data from one or more sensors 86 associated with the first electronic gaming machine 14 may be utilized to determine the user ability level of the user.

In some embodiments, the user 72 may provide an explicit indication of the user's ability level to the audio adjustment program via input to the first electronic gamine machine 14. For example, the user 72 may say, "I've reached level 7 of 1$^{st}$ Game", "This is my first time playing 1$^{st}$ Game", or provide some other form of input indicating the user's ability level.

In some embodiments, the audio adjustment program 32 may provide to a user one or more benefits 56 related to a game in exchange for the user accepting an adjusted audio parameter in the form of an audio handicap. For example, in playing the first game 40, the user 72 may agree to accept one or more adjusted types of sound that increase the difficulty level of the first game from 3 to 5. In one example, a type of sound with a difficulty rating of 3 may be the sound of a twig snapping, while a corresponding type of sound with a difficulty rating of 5 may be the sound of grass brushing. Based on the user 72 accepting such an audio handicap, the audio adjustment program 32 may modify the rewards system of the first game 40 to award the user more points for particular game achievements as compared to the user playing the first game with the type of sound corresponding to a difficulty rating of 3.

In other embodiments, the audio adjustment program 32 may provide to a user one or more deficits 58 related to a game in exchange for the user accepting an adjusted audio parameter in the form of an audio advantage. For example, in playing the first game 40, the user 72 may request and accept one or more adjusted locations of sounds that decrease the difficulty level of the first game from 3 to 1. In one example, a location with a difficulty rating of 1 may involve minimal movement of the user 72 to see an approaching threat via display 216, while a corresponding location of the sound with a difficulty rating of 3 may necessitate additional movement of the user to see the threat. Based on the user 72 accepting such an audio advantage, the audio adjustment program 32 may modify the rewards system of the first game 40 to award the user fewer points for particular game achievements as compared to the user playing the first game with the location of sound corresponding to a difficulty rating of 3.

In some embodiments, audio handicaps 50 and/or audio advantages 52 may be selectively applied to one or more players of a multi-player game based on different user ability levels of the players. For example, 3 expert-level players may be playing the second game 42 when a new, novice-level player joins the game. Because the novice-level player has a lower user ability level than the 3 expert-level players, an audio handicap 50 may be applied to each of the 3 expert-level players. In addition or alternatively, an audio advantage 52 may be applied to the novice-level player.

In some embodiments, the audio adjustment program 32 may indicate to the user 72 that an adjusted audio parameter is being utilized to provide audio content of a game via the first electronic gaming machine 14. With reference to FIG. 2, in one example an adjusted audio indicator 260 may be displayed on display 216 to indicate that an adjusted audio parameter is being utilized. It will be appreciated that other forms and/or methods may be used to indicate that an adjusted audio parameter is being utilized. Such forms and/or methods include, but are not limited to, audio indicators and haptic feedback indicators via hand-held or wearable controllers or other devices.

Figure 4A:
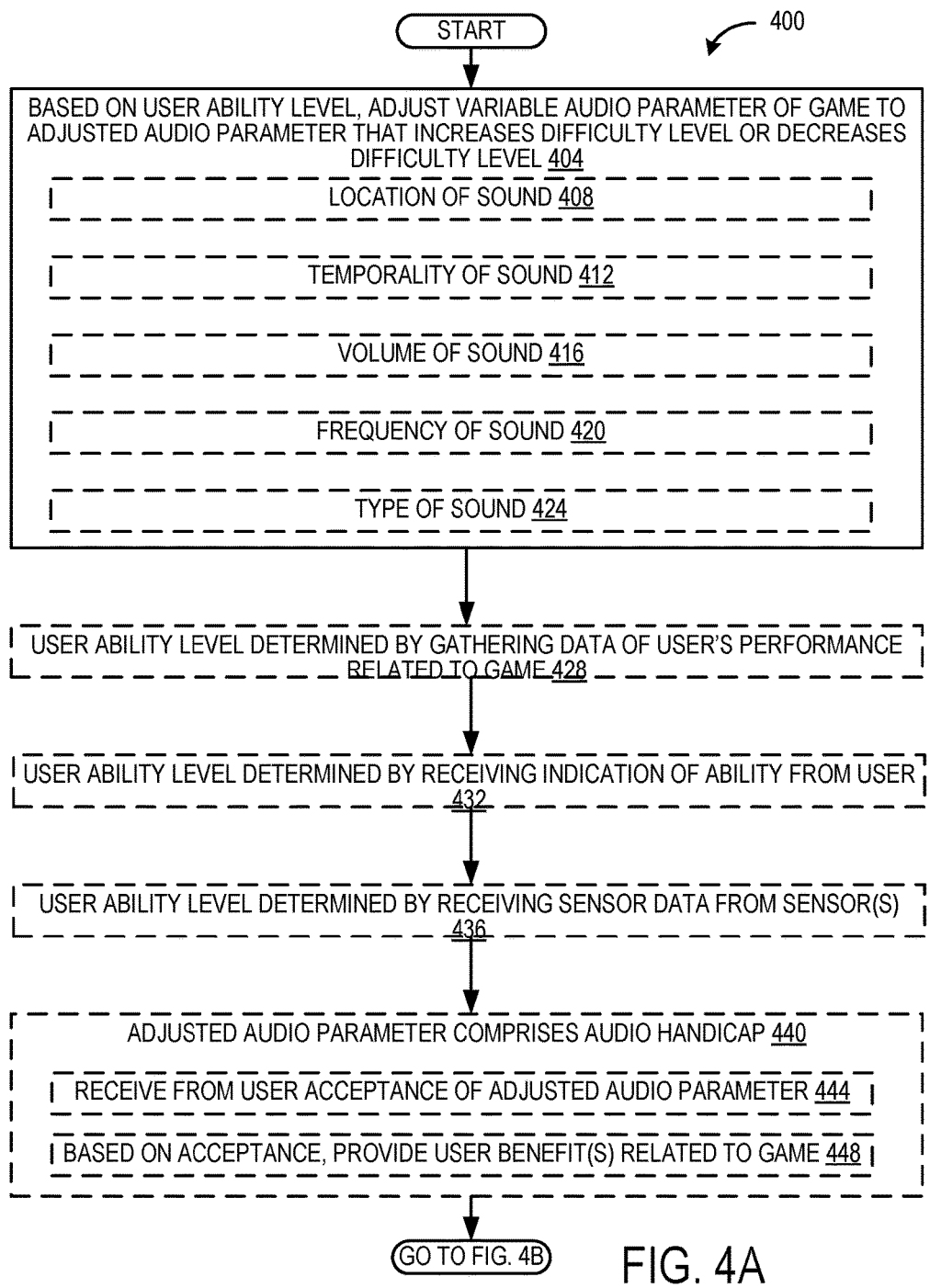
FIGS. 4A and 4B show a method of adjusting a variable audio parameter of a game according to an embodiment of the present disclosure.
Figure 4B:
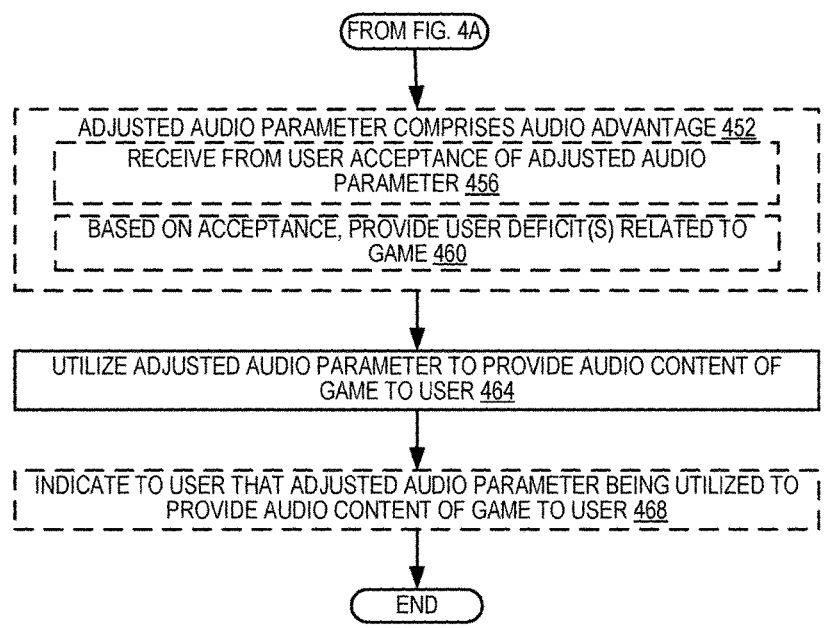

FIGS. 4A and 4B show a method 400 of adjusting a variable audio parameter of a game having a difficulty level according to an embodiment of the present disclosure. For example, the method 400 may be performed by the audio adjustment program 32 operating on the first electronic gaming machine 14 shown in FIG. 1. It will be appreciated that method 400 may also be performed in other contexts using other suitable hardware and software components.

At 404, the method 400 may include, based on a user ability level, adjusting the variable audio parameter of the game to an adjusted audio parameter that either increases the difficulty level of the game or decreases the difficulty level of the game. In some embodiments, at 408 the variable audio parameter may comprise a location of a sound. In some embodiments, at 412 the variable audio parameter may comprise a temporality of a sound. In some embodiments, at 416 the variable audio parameter may comprise a volume of a sound relative to an overall volume. In some embodiments, at 420 the variable audio parameter may comprise a frequency of a sound. In some embodiments, at 424 the variable audio parameter may comprise a type of a sound.

In some embodiments, at 428 the method 400 may include determining the user ability level by gathering data of the user's performance related to the game. In some embodiments, at 432 the method 400 may include determining the user ability level by receiving an indication of ability from the user. In some embodiments, at 436 the method 400 may include determining the user ability level by receiving sensor data from one or more sensors of the electronic gaming machine.

In some embodiments, at 440 the adjusted audio parameter may comprise an audio handicap. In these embodiments, at 444 the method 400 may include receiving from the user an acceptance of the adjusted audio parameter. At 448 and based on the acceptance, the method 400 may include providing to the user one or more benefits related to the game.

With reference now to FIG. 4B, in some embodiments at 452 the adjusted audio parameter may comprise an audio advantage. In these embodiments, at 456 the method 400 may include receiving from the user an acceptance of the adjusted audio parameter. At 460 and based on the acceptance, the method 400 may include providing to the user one or more deficits related to the game.

At 464 the method 400 may include utilizing the adjusted audio parameter to provide audio content of the game to a user via the electronic gaming machine. In some embodiments, at 468 the method 400 may include indicating to the user that the adjusted audio parameter is being utilized to provide audio content of the game to the user via the electronic gaming machine.

It will be appreciated that method 400 is provided by way of example and is not meant to be limiting. Therefore, it is to be understood that method 400 may include additional and/or alternative steps than those illustrated in FIGS. 4A and 4B. Further, it is to be understood that method 400 may be performed in any suitable order. Further still, it is to be understood that one or more steps may be omitted from method 400 without departing from the scope of this disclosure.

Figure 5:
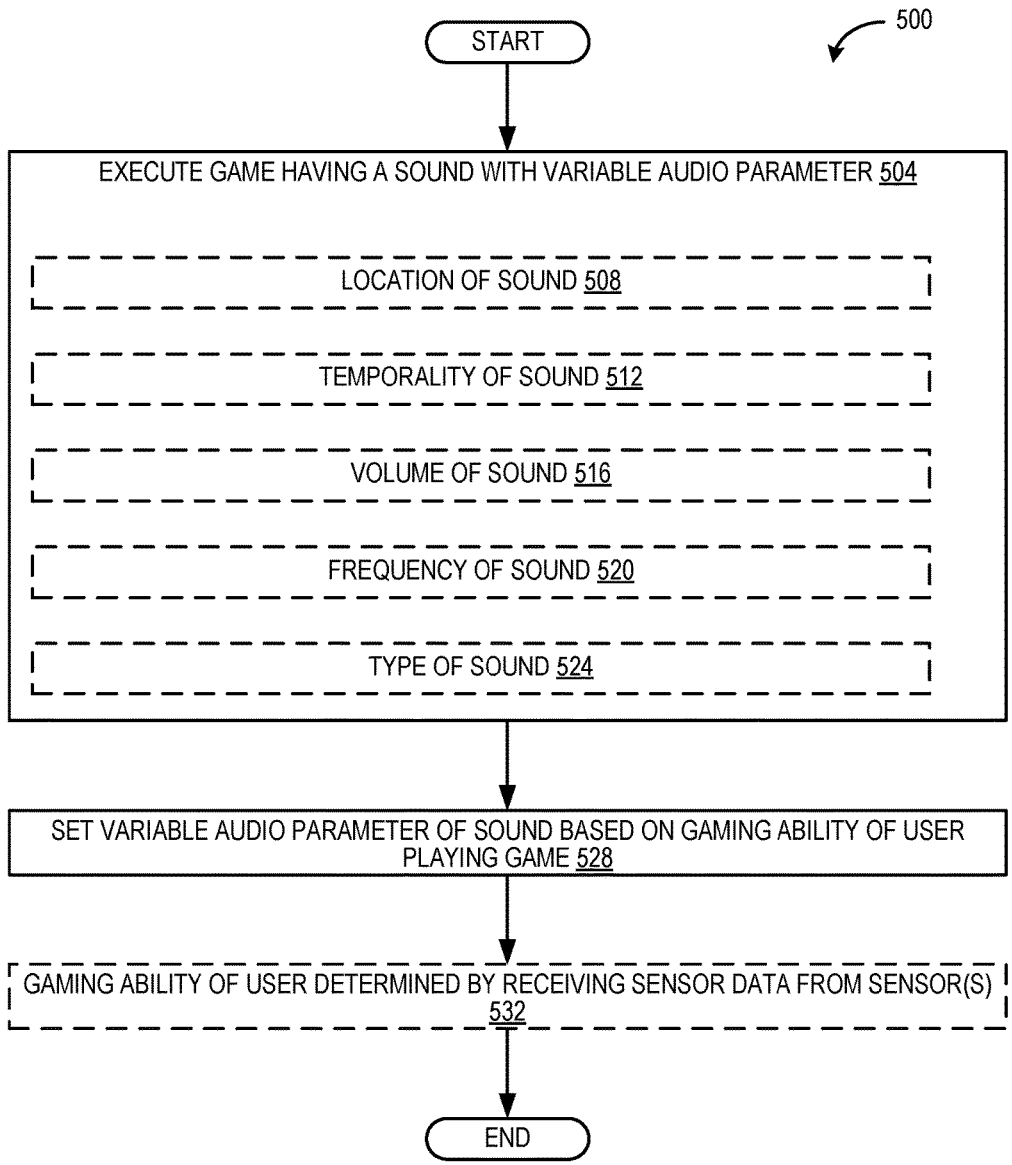
FIG. 5 shows a method of setting a variable audio parameter according to an embodiment of the present disclosure.

FIG. 5 shows a method 500 on an electronic gaming machine according to an embodiment of the present disclosure. For example, the method 500 may be performed by the audio adjustment program 32 operating on the first electronic gaming machine 14 shown in FIG. 1. It will be appreciated that method 500 may also be performed in other contexts using other suitable hardware and software components.

At 504, the method 500 may include executing a game having a sound with a variable audio parameter. In some embodiments, at 508 the variable audio parameter may comprise a location of a sound. In some embodiments, at 512 the variable audio parameter may comprise a temporality of a sound. In some embodiments, at 516 the variable audio parameter may comprise a volume of a sound relative to an overall volume. In some embodiments, at 520 the variable audio parameter may comprise a frequency of a sound. In some embodiments, at 524 the variable audio parameter may comprise a type of a sound. At 528 the method 500 may include setting the variable audio parameter of the sound based on a gaming ability of a user playing the game. In some embodiments, at 532 the method 500 may include determining the gaming ability of the user by receiving sensor data from one or more sensors of the electronic gaming machine.

It will be appreciated that method 500 is provided by way of example and is not meant to be limiting. Therefore, it is to be understood that method 500 may include additional and/or alternative steps than those illustrated in FIG. 5. Further, it is to be understood that method 500 may be performed in any suitable order. Further still, it is to be understood that one or more steps may be omitted from method 500 without departing from the scope of this disclosure.

Figure 6:
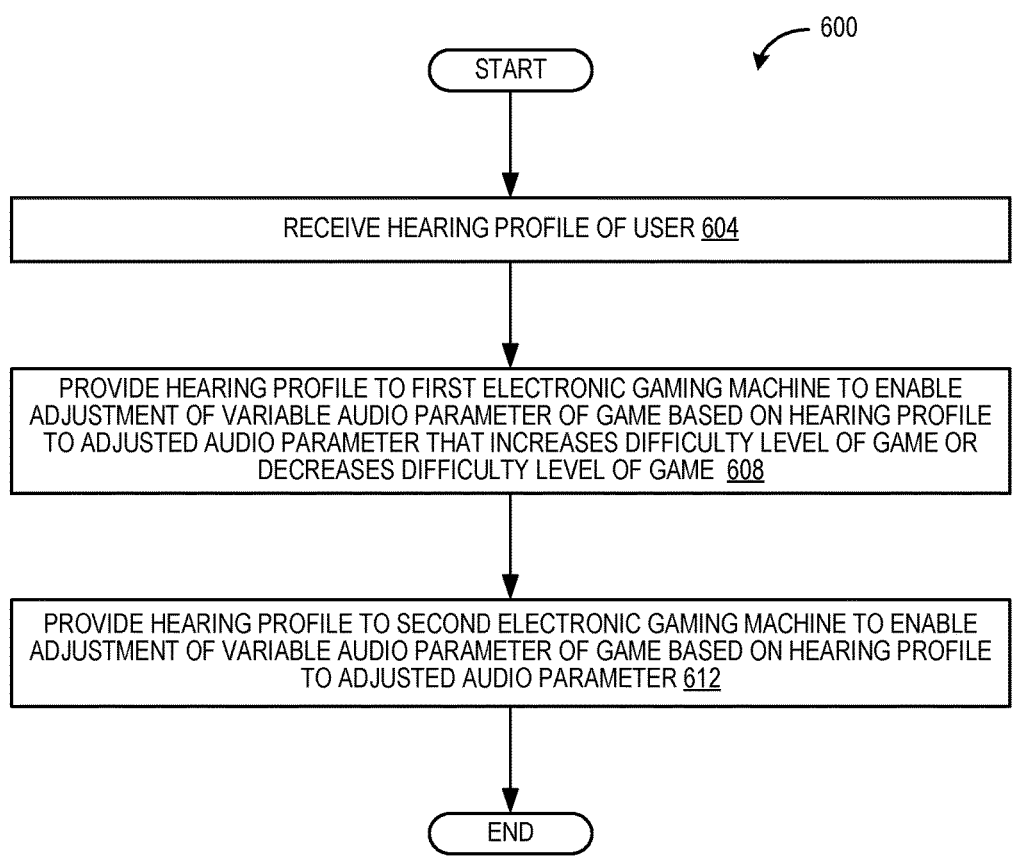
FIG. 6 shows a method of adjusting a variable audio parameter of a game across a plurality of different electronic gaming machines according to an embodiment of the present disclosure.

FIG. 6 shows a method 600 on a computing machine of adjusting a variable audio parameter of a game having a difficulty level across a plurality of different electronic gaming machines according to an embodiment of the present disclosure. For example, the method 600 may be performed by the audio adjustment program 32 operating on the server 26 shown in FIG. 1. It will be appreciated that method 600 may also be performed in other contexts using other suitable hardware and software components.

At 604, the method 600 may include receiving a hearing profile of a user. At 608 the method 600 may include providing the hearing profile to a first electronic gaming machine to enable the first electronic gaming machine to adjust the variable audio parameter of the game based on the hearing profile to an adjusted audio parameter that either increases the difficulty level of the game or decreases the difficulty level of the game. At 612 the method 600 may include providing the hearing profile to a second electronic gaming machine to enable the second electronic gaming machine to adjust the variable audio parameter of the game based on the hearing profile to the adjusted audio parameter.

It will be appreciated that method 600 is provided by way of example and is not meant to be limiting. Therefore, it is to be understood that method 600 may include additional and/or alternative steps than those illustrated in FIG. 6. Further, it is to be understood that method 600 may be performed in any suitable order. Further still, it is to be understood that one or more steps may be omitted from method 600 without departing from the scope of this disclosure.

It will also be appreciated that in some embodiments, the methods and processes described herein may be tied to a computing system of one or more computing machines. In particular, such methods and processes may be implemented as a computer-application program or service, an application-programming interface (API), a library, and/or other computer-program product.

Figure 7:
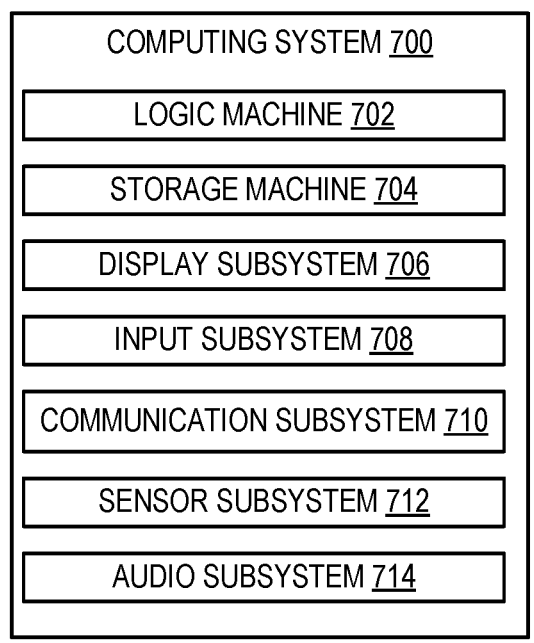
FIG. 7 shows a computing system according to an embodiment of the present disclosure.

FIG. 7 schematically shows a non-limiting embodiment of a computing system 700 that can enact one or more of the methods and processes described above. For example, computing system 700 may be representative of the first electronic gaming machine 14, second electronic gaming machine 18 or the server 26 shown in FIG. 1. Computing system 700 is shown in simplified form. Computing system 700 may take the form of one or more personal computers, server computers, tablet computers, home-entertainment computers, network computing machines, gaming devices, mobile computing machines, mobile communication devices (e.g., smart phone), and/or other computing machines.

Computing system 700 includes a logic machine 702 and a storage machine 704. Computing system 700 may optionally include a display subsystem 706, input subsystem 708, communication subsystem 710, sensor subsystem 712 (analogous to the sensors 86 of FIG. 1), audio subsystem 714 (analogous to speakers 68 of FIG. 1, speakers 220, 222, 224, and 226 of FIG. 2, and headphones 202 of FIG. 2), and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 702 may include one or more processors configured to execute software instructions. Additionally or alternatively, the logic machine 702 may include one or more hardware or firmware logic machines configured to execute hardware or firmware instructions. Processors of the logic machine 702 may be single-core or multi-core, and the instructions executed thereon may be configured for sequential, parallel, and/or distributed processing. Individual components of the logic machine 702 optionally may be distributed among two or more separate devices, which may be remotely located and/or configured for coordinated processing. Aspects of the logic machine 702 may be virtualized and executed by remotely accessible, networked computing machines configured in a cloud-computing configuration.

Storage machine 704 includes one or more physical devices configured to hold instructions executable by the logic machine 702 to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

It will be appreciated that a "service", as used herein, is an application program executable across multiple user sessions. A service may be available to one or more system components, programs, and/or other services. In some implementations, a service may run on one or more server-computing machines.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices. Examples of such display devices include, but are not limited to, the display 64 of FIG. 1, and the HMD device 200 and wall-mounted display 216 of FIG. 2.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing machines. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

When included, sensor subsystem 712 may include one or more sensors configured to sense different physical phenomenon (e.g., visible light, infrared light, sound, acceleration, orientation, position, etc.) as described above. Sensor subsystem 712 may be configured to provide sensor data to logic machine 702, for example. Such data may include, but is not limited to, audio information, depth tracking information, image information, gaze tracking information, ambient lighting information, position information, motion information, user location information, and/or any other suitable sensor data that may be used to perform the methods and processes described above.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On one or more electronic gaming machines, a method of adjusting a difficulty of a multiplayer game for different users of the multiplayer game, comprising:
   based on a first user ability level of a first user, selecting a first type of sound from a plurality of possible sounds to either increase a difficulty level of the multiplayer game or decrease the difficulty level of the multiplayer game for the first user;
   based on a second user ability level of a second user, selecting a second type of sound from a plurality of possible sounds to either increase the difficulty level of the multiplayer game or decrease the difficulty level of the multiplayer game for the second user, wherein the second type of sound is different than the first type of sound;
   utilizing the first type of sound to provide audio content of the multiplayer game to the first user; and
   utilizing the second type of sound to provide audio content of the multiplayer game to the second user.

2. The method of claim 1, wherein the first user ability level is determined by receiving sensor data from one or more sensors of the one or more electronic gaming machines.

3. The method of claim 1, wherein the selection of the first type of sound comprises an audio handicap, and further comprising receiving from the first user an acceptance of the selection of the first type of sound; and based on the acceptance, providing to the first user one or more benefits related to the multiplayer game.

4. The method of claim 1, wherein the selection of the first type of sound comprises an audio advantage, and further comprising receiving from the first user an acceptance of the selection of the first type of sound; and based on the acceptance, providing to the first user one or more deficits related to the multiplayer game.

5. The method of claim 1, further comprising indicating to the first user that the first type of sound is being utilized to provide audio content of the multiplayer game to the first user via the one or more electronic gaming machines.

6. An electronic gaming machine, comprising:
   a logic machine; and
   a storage machine storing instructions that are executable by the logic machine to:

execute a multiplayer game having a sound having a type variably selected from a plurality of sound types; and select the type of sound differently for a user of the multiplayer game compared to another user of the multiplayer game based on a different gaming ability of the user compared to a gaming ability of the other user.

7. The electronic gaming machine of claim 6, wherein the sound is played according to a variable audio parameter based on the different gaming ability.

8. The electronic gaming machine of claim 7, wherein the variable audio parameter comprises a temporality of a sound.

9. The electronic gaming machine of claim 7, wherein the variable audio parameter comprises a volume of a sound relative to an overall volume.

10. The electronic gaming machine of claim 6, wherein the gaming ability of the user is determined by receiving sensor data from one or more sensors of the electronic gaming machine.

11. The method of claim 1, wherein the first sound is played according to a variable audio parameter.

12. The method of claim 11, wherein the variable audio parameter comprises a temporality of a sound.

13. The method of claim 11, wherein the variable audio parameter comprises a volume of a sound relative to an overall volume.

14. The method of claim 11, wherein the variable audio parameter comprises a frequency of a sound.

15. The method of claim 11, wherein the variable audio parameter comprises a location of a sound.

16. The method of claim 1, wherein the first user ability level is determined by gathering data of the first user's performance related to the multiplayer game.

17. The method of claim 1, wherein the first user ability level is determined by receiving an indication of ability from the first user.

18. A method of individualizing multiplayer game difficulty, comprising:

assessing a user ability level of a user playing the multiplayer game, the user being one of a plurality of users playing the multiplayer game;

selecting a type of a sound from a plurality of possible sounds based on the user ability level, the type of sound selected differently for different users of the plurality of users based on different user ability levels; and outputting the sound selected based on the user ability level.

19. The method of claim 18, wherein the user ability level is determined by gathering data of the user's performance related to the multiplayer game.

20. The method of claim 18, wherein the user ability level is determined by receiving an indication of ability from the user.

* * * * *